United States Patent [19]

Weinstein et al.

[11] Patent Number: 4,498,917
[45] Date of Patent: Feb. 12, 1985

[54] METHOD AND APPARATUS FOR LASER SIZING OF OPTICAL FIBERS

[75] Inventors: Paul Weinstein, Orange; Barry L. Kelmachter, Cheshire, both of Conn.

[73] Assignee: Olin Corporation, New Haven, Conn.

[21] Appl. No.: 517,303

[22] Filed: Jul. 26, 1983

[51] Int. Cl.³ .................... C03B 37/10; C03C 25/00
[52] U.S. Cl. .......................... 65/2; 65/11.1;
   65/23; 134/1; 219/121 LS; 219/121 LH; 219/121 LJ
[58] Field of Search .............. 134/1; 65/2, 11.1, 23; 219/121 LP, 121 LS, 121 LH, 121 LJ

[56] References Cited

U.S. PATENT DOCUMENTS

| | | | |
|---|---|---|---|
| 3,865,564 | 2/1975 | Jaeger et al. | 65/2 |
| 3,892,488 | 7/1975 | Edmonds | 219/121 LS X |
| 3,981,705 | 9/1976 | Jaeger et al. | 65/2 |
| 4,129,433 | 12/1978 | Jaeger et al. | 65/2 |
| 4,135,902 | 1/1979 | Oehrle | 65/2 |
| 4,170,726 | 10/1979 | Okuda | 219/121 LS |
| 4,215,263 | 7/1980 | Grey et al. | 219/121 L |

FOREIGN PATENT DOCUMENTS 125038 11/1978 Japan ...................... 65/3.11
55-8954 3/1980 Japan ...................... 65/3.11

OTHER PUBLICATIONS

Fabrication of Channel Optical Waveguides in Glass CW Laser Heating, Jou. App. Physics, vol. 45, #11, Nov. 1974, Pavlopoulos et al., pp. 4964–4968.

*Primary Examiner*—Robert Lindsay
*Attorney, Agent, or Firm*—Barry L. Kelmachter; Howard M. Cohn; Paul Weinstein

[57] ABSTRACT

A system for machining and sizing optical fibers is described herein. The system uses a laser beam to machine oversized regions of a buffer material surrounding an optical fiber to create a coated optical fiber having a substantially uniform maximum outer dimension that is within a desired tolerance. The machining of the buffer material is accomplished by forming a substantially cylindrical laser beam having a hollow central portion and passing the optical fiber to be sized through the hollow central portion. The hollow central portion has a dimension or diameter substantially equal to a desired outer dimension or diameter for the optical fiber. Any discontinuities or oversized regions of buffer material outside the hollow central portion diameter will be contacted and vaporized by the substantially cylindrical laser beam.

18 Claims, 7 Drawing Figures

METHOD AND APPARATUS FOR LASER SIZING OF OPTICAL FIBERS

This application is related to co-pending U.S. patent application Ser. No. 517,302, filed on July 26, 1983, to Weinstein et al. for a LASER SIZING SYSTEM FOR FIBER OPTIC BUFFERS.

This invention relates to the sizing of optical fibers.

The use of optical fiber cables has become widespread in communication applications. This is mainly due to such advantages as low weight, low loss and a relatively wide transmission band. For many applications such as deployment in undersea and underground environments, the cables are fabricated with a metal containment tube surrounding one or more optical fibers. The metal tube protects the fiber or fibers and also serves in a variety of roles. For example, the containment tube may act as a strength member, as an electrical conductor and/or as an environmental barrier.

One of the problems associated with the fabrication of such optical fiber cables is the lack of a uniform outer dimension for most optical fibers. Frequently, optical fibers coated with a protective or buffer material have bumps, distortions and/or discontinuities along their outer periphery. These random bumps, distortions and/or discontinuities cause the fiber to have an irregular outer dimension and make fabrication of relatively uniform protective containment tubes difficult. For example, a containment tube having an irregular outer dimension could be formed. If the bumps, distortions and/or discontinuities are located in the metal tube seam area, they could hamper sealing of the seam. These random bumps, distortions and/or discontinuities could also lead to fiber damage. For example, if the containment tube is a preformed tube having an inner periphery close in tolerance to the fiber outer dimension, excess buffer material could cause the fiber to kink, break and/or bend during fiber insertion into the tube.

As a result of these problems, the sizing of optical fibers has been of concern to cable manufacturers. Besides manufacturing concerns, precise diameter control of optical fibers is desirable because it minimizes optical losses and facilitates low-loss splicing of individual glass fibers.

Optical fibers are generally made using a drawing technique. In some optical fiber fabrication systems, a laser beam is used to heat a glass preform from which the glass fiber is drawn. The fabrication systems also generally include an optical system for focusing the laser beam around the glass preform. U.S. Pat. Nos. 3,981,705 to Jaeger et al., 4,135,902 to Oehrle and 4,215,263 to Grey et al. illustrate some of the optical fiber fabrication systems known in the art employing laser heating devices.

In one optical fiber fabrication system, a laser beam is used to heat the end of the preform until the glass is in a molten state. The fiber is thereafter drawn from the molten region. The diameter of the drawn fiber is monitored and the drawing parameters are changed in response to fiber diameter variations in order to obtain a fiber of approximately constant diameter. U.S. Pat. No. 3,865,564 to Jaeger et al. illustrates this type of fabrication system.

In another type of system, an optical fiber is drawn from a preform using a laser whose output power is varied periodically. The pulsing of the laser causes diameter variations in the optical fibers. By pulsing the laser at a desired rate, a desired set of periodic diameter variations can be created in the fiber. U.S. Pat. No. 4,129,433 to Jaeger et al. describes this type of system.

The goal of producing coated glass fibers having substantially uniform outer diameters has not always been achieved with these systems. Therefore, it becomes desirable to incorporate into an optical fiber cable fabrication system an apparatus for sizing and machining the optical fibers to ensure that the fibers do not exceed a desired outer dimension.

In accordance with the present invention, a laser machining and sizing system is provided. The system of the present invention uses a laser beam to machine oversized regions of a protective layer surrounding an optical fiber to create a coated optical fiber having a substantially uniform maximum outer dimension that is within a desired tolerance specification.

The machining of the protective layer or the buffer material is accomplished by forming a substantially cylindrical laser beam having a hollow central portion and passing the optical fiber to be sized through the hollow central portion. The hollow central portion has a dimension or diameter substantially equal to a desired outer dimension or diameter for the optical fiber. Any discontinuities or oversized regions of buffer material outside the hollow central portion diameter will be contacted and vaporized by the laser beam.

The hollow central portion of the substantially cylindrical laser beam preferably is formed using two laser beams and an optical shaping system. The laser beams are preferably generated by at least one high power laser capable of generating a relatively high temperature solid core laser beam. It is desirable to generate a relatively high temperature laser beam to insure that the regions of excess buffer material are vaporized.

The laser beams are shaped into substantially semi-cylindrical beams having a hollow central region by two specially adapted shaping mirrors. Each shaping mirror is designed to reflect only a hollowed out substantially semi-cylindrical portion of each laser beam while permitting the remainder of the beam to pass therethrough. In a preferred embodiment, each shaping mirror has either a substantially semi-circular notch or other appropriately shaped aperture for permitting the unreflected portion of the laser beam to pass therethrough. Preferably, the laser beam generator and the shaping mirrors are arranged so that the substantially semi-cylindrical laser beams are created on opposite sides of the optical fiber to be sized.

After the substantially semi-cylindrical beams have been created, they are redirected along a line substantially parallel to the movement of the optical fiber to form the substantially cylindrical beam having a hollow central portion. In a preferred embodiment, the substantially semi-cylindrical beams are redirected by reflection off a mirrored surface of a substantially V-shaped mirror having an aperture at its vertex. The aperture is sized to have a dimension as close as possible to the desired outer dimension for the optical fiber. By doing this and by providing the mirror with a relatively sharp line at the vertex, it is possible to form the semi-cylindrical beams into a substantially cylindrical beam having a hollow central portion with a dimension or diameter substantially equal to a desired optical fiber outer dimension or diameter. In order that only oversized regions of buffer material are contacted by the laser beams and other buffer material portions and the glass fiber itself are not crossed by the laser beams, each laser beam should be a collimated laser beam.

After the beam has traveled along the fiber for a desired length sufficient to vaporize any discontinuities or oversized regions of the buffer or protective layer, it is reflected away from the fiber into appropriate absorbers. The laser beam is preferably reflected away from the fiber by a second substantially V-shaped mirror opposed to the first substantially V-shaped mirror.

It is an object of the present invention to provide a technique for sizing coated optical fibers to provide them with an outer dimension within desired tolerance specifications.

It is a further object of the present invention to provide a laser machining apparatus for performing the above sizing technique.

These and other objects will become more apparent from the following description and drawings in which like elements have been given like reference numbers.

Figure 1:
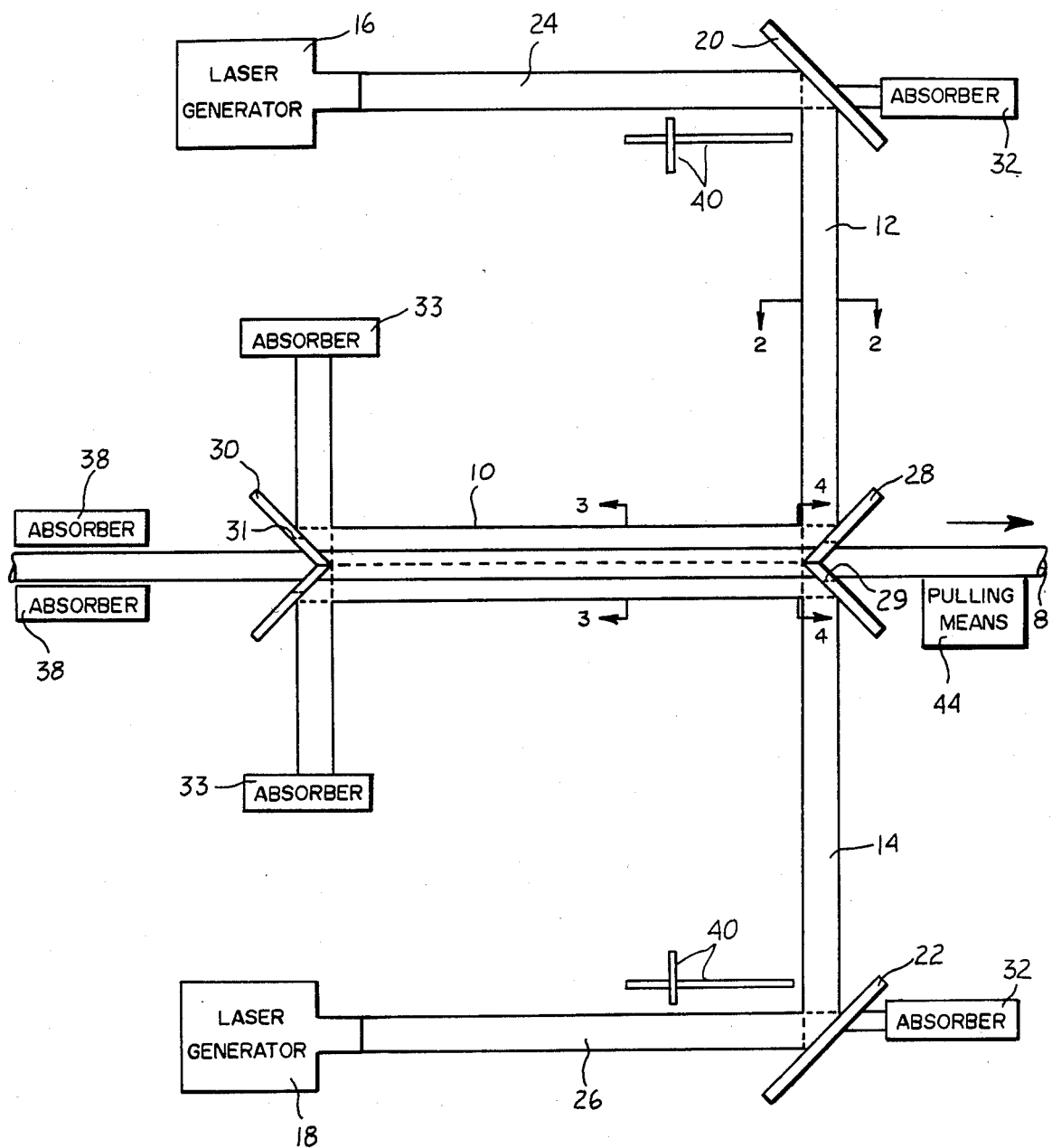
FIG. 1 is a schematic representation of an apparatus for laser sizing optical fibers.
Figure 2:
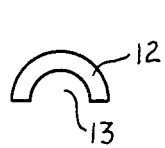
FIG. 2 is a cross-sectional view of a semi-cylindrical laser beam taken along lines 2—2 in FIG. 1.

In accordance with the present invention, it is proposed to provide a technique for insuring that a coated optical fiber has a substantially uniform maximum outer dimension or diameter along its length that is within desired tolerance specifications. The technique of the present invention uses at least one laser beam configured to have a substantially cylindrical cross-sectional shape with a hollowed-out central portion to size the optical fiber and to remove any discontinuities or excess buffer material from about the optical fiber.

Referring now to the Figures, an exemplary laser machining or sizing system is illustrated. The system utilizes a substantially cylindrical laser beam 10 to vaporize any discontinuities or excess buffer material 9 surrounding an optical fiber 8. The laser beam 10 is formed with a hollow core portion 11 having a dimension substantially equal to a desired outer dimension for the coated optical fiber. By passing the fiber 8 through the hollow core portion 11, the fiber is sized or machined to have an outer dimension within a desired tolerance.

The laser beam 10 is formed by optically shaping a pair of solid cross section collimated laser beams 24 and 26 into a pair of mirror-image, substantially semi-cylindrical beams 12 and 14 having respective hollow central portions 13 and 15. It has been found that by forming the substantially cylindrical laser beam 10 from a pair of mirror-image, semi-cylindrical beams 12 and 14, it is possible to form a laser beam that closely surrounds the optical fiber to be sized without crossing the optical fiber itself.

The solid cross section collimated laser beams 24 and 26 may be formed using any suitable laser beam generator known in the art. Preferably, the laser beams 24 and 26 are formed by a pair of opposed laser beam generators 16 and 18. While laser beam generators 16 and 18 may comprise any suitable laser beam generator known in the art, they preferably are high power laser beam generators. High power laser beam generators are preferred because they are capable of generating beams having the relatively high temperatures needed to vaporize typical plastic-type buffer materials used to coat optical fibers. In a preferred embodiment, each of the laser beam generators 16 and 18 comprises a gas laser such as a $CO_2$ laser. The laser beam generators 16 and 18 are preferably arranged so as to create a pair of laser beams 24 and 26 that are substantially parallel to the direction of movement of the coated optical fiber 8.

The solid cross section laser beams 24 and 26 are optically shaped into hollow central portion, generally semi-cylindrical beams 12 and 14 by specially designed shaping mirrors 20 and 22. The mirrors 20 and 22 shape the laser beams 24 and 26 by reflecting only a hollowed-out, semi-cylindrical portion of each beam while permitting the remainder of the beam to pass through the mirror. To permit part of the beam to pass therethrough, each mirror 20 and 22 is provided with either a semi-circular notch 34 or other appropriately shaped aperture 36. The mirror with a notch 34 would be used where the mirror intercepts only the top-half of the solid cross section laser beam, while the mirror with the aperture would be used where the mirror intercepts the entire solid cross section laser beam.

The mirrors 20 and 22 preferably are oriented so that the semi-cylindrical beams 12 and 14 extend substantially perpendicular to the direction of travel of the coated fiber 8. The mirrors 20 and 22 may be supported in any suitable fashion by any conventional means (not shown) known in the art. For example, the mirrors 20 and 22 may be arranged in a fixed position or they may be adjustable.

Each of the mirrors 20 and 22 preferably has a substantially planar reflective surface formed from a suitable reflective material. For example, the reflective surface may be formed from a highly polished metal such as aluminum or gold, from a suitable glass such as a high temperature glass or any other suitable reflective material known in the art.

The portion of the beams 24 and 26 permitted to pass through the mirrors 20 and 22 are absorbed by absorbers 32. The absorbers 32 may comprise any conventional means known in the art such as a black box or filter.

After the semi-cylindrical laser beams 12 and 14 have been formed, they are directed to a substantially V-shaped mirror 28 having an aperture 29 at its vertex. The mirror 28 is aligned so that the beams 12 and 14 are redirected substantially parallel to the optical fiber optical axis and direction of travel to form the closely surrounding, hollow core, substantially cylindrical laser beam 10. In order that the laser beam 10 may closely surround the optical fiber, it is desirable that the line at the vertex of the V-shaped mirror 28 be as sharp as possible. The aperture 29 should have a dimension that is just as close as possible to the desired optical fiber outer dimension. Preferably, the aperture 29 is within about 0.002" of the desired optical fiber outer dimension and preferably within about 0.001" of such dimension. By providing the aperture 29 with such a dimension, the sized optical fiber can freely pass therethrough and the production of a closely surrounding cylindrical beam can be more easily achieved.

The mirror 28 may be formed from any suitable reflective material known in the art such as high temperature glass or highly polished metal. Further, the mirror 28 may be supported in any suitable fashion by any suitable means (not shown) known in the art.

The beam 10 travels along the fiber for a desired length sufficient to vaporize any discontinuities or oversized regions of buffer material. A second substantially V-shaped mirror 30 in opposition to the first substantially V-shaped mirror 28 is arranged to reflect the beams 12 and 14 forming the cylindrical beam 10 away from the fiber 8 into appropriate absorbers 33. The V-shaped mirror 30 may be formed from any suitable reflective material known in the art such as high temperature glass or a highly polished metal and may be supported by any suitable means (not shown) known in the art.

The mirror 30 is also provided with an aperture 31 through which the optical fiber travels. The aperture 31 need not be sized to as close a tolerance as the aperture 29 and should be larger than the desired optical fiber outer dimension to allow any discontinuities or oversized regions to pass through. Any portion of the laser beam 10 that may pass through the aperture 31 can be absorbed by absorbers 38. The absorbers 38 and 33 may comprise any conventional absorption means known in the art.

In using the system of the present invention, it is important that the laser beam never contact the fiber except for the discontinuities or oversized regions. Therefore, the coated fiber 8 should be held under sufficient tension to maintain its straightness in the laser machining region between the mirrors 28 and 30. Any suitable means 44 known in the art may be used to pull the fiber 8 through the sizing system and to apply tension to the fiber 8. Furthermore, the laser beams 12 and 14 should be collimated beams so that portions of the buffer material within the desired outer dimension and the glass fiber itself are not contacted by the laser beams 12 and 14.

If desired, a plurality of baffles 40 can be employed to insure that there is no reflection of the fiber 8 or the mirror 28 on the mirrors 20 and 22. The baffles 40 may comprise any suitable baffle arrangement known in the art such as a member with a flat black painted coating.

The mirrors 20, 22, 28 and 30 can be cooled, if desired, to remove any heat generated by the laser beams. Any suitable cooling device (not shown) known in the art may be used to cool the mirrors 20, 22, 28 and 30. For example, the mirrors 20, 22, 28 and 30 may be air-cooled or water-cooled.

After the optical fiber has been sized, it may be passed to an apparatus not shown for fabricating a metal containment tube not shown about the fiber itself or about a plurality of sized fibers. A suitable system for fabricating an optical fiber cable having a metal containment tube surrounding one or more fibers is shown in co-pending U.S. patent application Ser. Nos. 413,846, filed Sept. 1, 1982; 497,639, filed May 24, 1983; 497,535, filed May 24, 1983; 497,533, filed May 24, 1983; 497,546, filed May 24, 1983; and 497,522, filed May 24, 1983, all to Winter et al. The laser sizing system of the present invention may be used as part of an on-line optical fiber cable fabrication system or may be used off-line as a separate optical fiber sizing operation.

While the laser sizing system of the present invention has been shown as employing two separate laser beam generators 16 and 18, if desired a single laser beam generator not shown could be used with appropriate optical splitting of the laser beam.

While it is preferred to use reflecting mirrors 20 and 22 having either an aperture or a notch to permit the beam to pass therethrough, other means could be employed to mask the solid cross section beams 24 and 26 to provide the hollow central portion semi-cylindrical beams 12 and 14. One reason the masking approach is less preferred is that it would result in a heat build-up on the mask.

Figure 3:
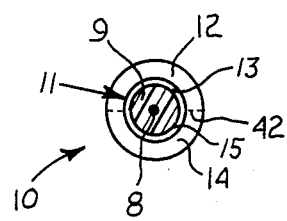
FIG. 3 is a cross-sectional view of the optical fiber being sized and the laser beam used for sizing taken along lines 3—3 in FIG. 1.
Figure 5:
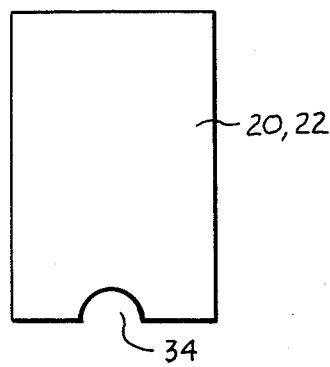
FIG. 5 is a top view of a first embodiment of a mirror for shaping a laser beam to have a hollowed-out, semi-cylindrical cross section.
Figure 6:
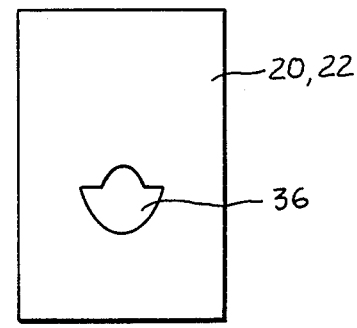
FIG. 6 is a top view of an alternative embodiment of a mirror for shaping a laser beam to have a hollowed-out, semi-cylindrical cross section.
Figure 4:
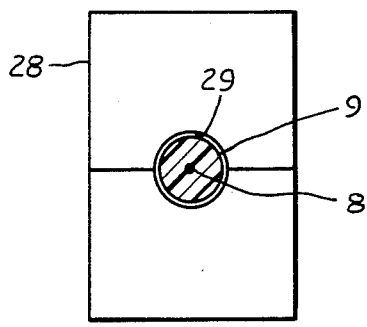
FIG. 4 is a cross-sectional view taken along lines 4—4 in FIG. 1.
Figure 7:
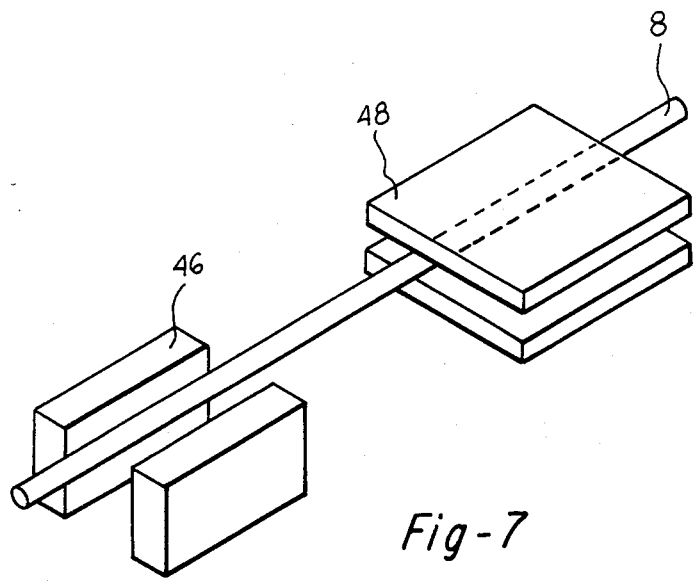
FIG. 7 is a schematic representation of an alternative laser sizing apparatus.

While in theory the overlapped beams in the laser machining region provide a cylindrical configuration as shown in FIG. 3, it is possible that the intersection line of the substantially V-shaped mirror 28 could result in a line of demarcation 42 between the beams 12 and 14 which might leave an undesirable flash on the fiber. Referring now to FIG. 7, if this were to be the case, the flash could be removed by providing a second laser machining system 48 oriented at an angle with respect to a first laser machining system 46. Each of the laser machining systems 46 and 48 has the same construction as the laser machining system in FIG. 1. Preferably, the laser machining systems 46 and 48 are arranged orthogonal to each other.

While the reflecting mirrors 28 and 20 have been described as being substantially V-shaped mirrors, they could also each be a conical mirror having an aperture at its vertex.

The laser machining and sizing technique of the present invention may be performed in any suitable atmosphere. For example, it may be performed in air, in an inert gas atmosphere or in a reactive atmosphere. If desired, it may be performed in a vacuum.

The patents and patent applications set forth in the specification are intended to be incorporated by reference herein.

It is apparent that there has been provided in accordance with this invention a technique for laser sizing optical fibers which fully satisfies the objects, means, and advantages set forth hereinbefore. While the invention has been described in combination with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

We claim:

1. A method for sizing and machining a coated optical fiber having a buffer material surrounding a glass fiber to provide said optical fiber with a desired outer dimension, said method comprising:

forming a substantially cylindrical laser beam having a hollow central portion with a dimension substantially equal to said desired optical fiber outer dimension, said forming step comprising forming two substantially semi-cylindrical laser beams each having a hollowed-out core portion; and passing said optical fiber through said hollowed-out core portions to vaporize with said laser beams oversized regions of said buffer material extending beyond said hollowed-out core portions into said laser beams.

2. The method of claim 1 wherein said step of forming two substantially semi-cylindrical laser beams comprises:
forming two opposed laser beams having a solid cross section; and
shaping each said beam to have a hollowed-out, substantially semi-cylindrical cross section.

3. The method of claim 2 wherein said shaping step comprises:
reflecting a hollowed-out, substantially semi-cylindrical portion of each said opposed laser beam while permitting the remaining portion of each said opposed laser beam to pass without reflection.

4. The method of claim 3 further comprising:
absorbing the remaining portion of each said opposed laser beam.

5. The method of claim 3 further comprising:
redirecting each said substantially semi-cylindrical laser beam so that said beams substantially surround said optical fiber and travel along said optical fiber for a length sufficient to vaporize said oversized regions.

6. The method of claim 5 further comprising:
substantially re-reflecting said redirected substantially semi-cylindrical beams away from said fiber; and
absorbing said re-reflected substantially semi-cylindrical laser beams and any remaining redirected laser beams.

7. The method of claim 5 further comprising:
removing any flash on said optical fiber caused by said redirected substantially semi-cylindrical laser beams.

8. The method of claim 7 wherein said flash removing step comprises:
forming another substantially cylindrical beam having a hollow central portion with a dimension substantially equal to said desired optical fiber outer dimension, and
passing said optical fiber through said hollow central portion of said another substantially cylindrical beam to remove any said flash.

9. An apparatus for sizing and machining an optical fiber to provide said fiber with a desired outer dimension, said optical fiber having a buffer material surrounding a glass fiber, said apparatus comprising:
means for forming a substantially cylindrical laser beam having a hollow central portion, said hollow central portion having a dimension substantially equal to said desired optical fiber outer dimension;
said laser beam forming means comprising at least one laser beam generator and means for forming said laser beam generated by said at least one generator into two substantially semi-cylindrical laser beams each having a hollowed-out core portion; and
means for moving said coated optical fiber through said hollowed-out core portions to vaporize oversized regions of said buffer material extending beyond said hollowed-out core portions into said laser beams whereby said optical fiber is provided with said desired outer dimension.

10. The apparatus of claim 9 further comprising:
two laser beam generators for generating two solid core laser beams, said generators being located on opposite sides of said optical fiber; and
said forming means comprising two reflectors each having means for permitting a portion of said solid core laser beam to pass therethrough, each of said reflectors being associated with a respective one of said generators,
whereby each reflector reflects a hollowed-out substantially semi-cylindrical portion of each solid core laser beam while permitting the remainder of each said solid core laser beam to pass through said reflector.

11. The apparatus of claim 10 wherein said permitting means comprises:
a substantially semi-circular notch in each said reflector.

12. The apparatus of claim 10 wherein said permitting means comprises:
an aperture in each said reflector.

13. The apparatus of claim 10 further comprising:
means for absorbing the remainder of each said solid core laser beam.

14. The apparatus of claim 9 further comprising:
means for redirecting said substantially semi-cylindrical laser beams so that said beams substantially surround said optical fiber and travel along said optical fiber for a length sufficient to vaporize said oversized regions.

15. The apparatus of claim 14 wherein said redirecting means comprises:
a substantially V-shaped mirror having an aperture at its vertex through which said optical fiber passes, said aperture being sized to have a dimension as close as possible to said desired fiber outer dimension.

16. The apparatus of claim 14 further comprising:
means for reflecting said substantially semi-cylindrical beams away from said fiber; and
means for absorbing said reflected substantially semi-cylindrical laser beams.

17. The apparatus of claim 16 wherein said reflecting means comprises:
a substantially V-shaped mirror having an aperture at its vertex, said aperture being sized to permit said fiber with said oversized regions to pass therethrough.

18. The apparatus of claim 9 further comprising:
two of said sizing and machining apparatuses arranged axially along said optical fiber, one of said apparatuses being rotated about the optical axis of said fiber relative to the other of said apparatuses, whereby any flash on said optical fiber caused by said semi-cylindrical beams is removed.

* * * * *